(12) United States Patent
Wu et al.

(10) Patent No.: US 8,833,978 B2
(45) Date of Patent: Sep. 16, 2014

(54) TRAFFIC SIGNAL LIGHT DEVICE

(71) Applicant: Leotek Electronics Corporation, Lung-Tan (TW)

(72) Inventors: Chen-Ho Wu, Los Altos Hills, CA (US); Chin-Wang Tu, Cupertino, CA (US); Shih-Chang Wang, Jhonghe District (TW); Yi-Kai Cheng, Zhongshan District (TW); Shu-Chun Chang, Xinshe District (TW); Bing-Yu Wu, West District (TW)

(73) Assignee: Leotek Electronics Corporation, Lung-Tan, Tao Yuan County (TW)

( * ) Notice: Subject to any disclaimer, the term of this patent is extended or adjusted under 35 U.S.C. 154(b) by 0 days.

(21) Appl. No.: 13/656,491

(22) Filed: Oct. 19, 2012

(65) Prior Publication Data

US 2013/0107540 A1    May 2, 2013

Related U.S. Application Data

(60) Provisional application No. 61/551,156, filed on Oct. 25, 2011.

(51) Int. Cl.

| | |
|---|---|
| *F21V 7/00* | (2006.01) |
| *G02B 3/08* | (2006.01) |
| *F21V 13/04* | (2006.01) |
| *F21V 5/02* | (2006.01) |
| *F21V 5/04* | (2006.01) |
| *F21W 111/00* | (2006.01) |
| *F21W 131/103* | (2006.01) |
| *F21Y 101/02* | (2006.01) |
| *F21Y 105/00* | (2006.01) |

(52) U.S. Cl.
CPC ............... *F21V 5/045* (2013.01); *F21V 13/04* (2013.01); *F21V 5/02* (2013.01); *F21W 2111/00* (2013.01); *F21W 2131/103* (2013.01); *F21Y 2101/02* (2013.01); *F21Y 2105/001* (2013.01)
USPC ...................... 362/309; 362/249.02; 359/742

(58) Field of Classification Search
None
See application file for complete search history.

(56) References Cited

U.S. PATENT DOCUMENTS

| | | | |
|---|---|---|---|
| 4,505,551 A * | 3/1985 | Jacobs ........................... | 359/232 |
| 5,947,587 A | 9/1999 | Keuper et al. | |
| 6,911,915 B2 | 6/2005 | Wu et al. | |
| 2002/0186566 A1* | 12/2002 | McKenney .................... | 362/326 |
| 2007/0139921 A1* | 6/2007 | Wu ............................... | 362/240 |
| 2011/0035977 A1* | 2/2011 | Wilson et al. ................... | 40/582 |
| 2011/0134636 A1* | 6/2011 | Chang et al. ................... | 362/235 |
| 2011/0235338 A1* | 9/2011 | Chen et al. ............... | 362/311.02 |
| 2011/0249422 A1* | 10/2011 | Wong et al. ..................... | 362/17 |
| 2012/0119672 A1* | 5/2012 | Meyer ........................... | 315/294 |
| 2012/0145822 A1* | 6/2012 | Roemerman et al. ......... | 244/3.11 |

* cited by examiner

*Primary Examiner* — Donald Raleigh
(74) *Attorney, Agent, or Firm* — DLA Piper LLP (US)

(57) ABSTRACT

A traffic signal light device that includes a spread window, a Fresnel lens, and an LED module for emitting light. The light emitted by the LED module passes through the Fresnel lens and to the spread window. The LED module is disposed at a position that is offset from an axis of the spread window that passes through a center of, and is perpendicular to, the spread window. The Fresnel lens can have a saw-toothed pattern of teeth formed as concentric circles on one surface of the Fresnel lens sharing a common center, where the size or height of the teeth vary. The spread window can have a plurality of protruding cells of varying size on a surface of the spread window.

18 Claims, 10 Drawing Sheets

TRAFFIC SIGNAL LIGHT DEVICE

RELATED APPLICATIONS

This application claims the benefit of U.S. Provisional Application No. 61/551,156, filed Oct. 25, 2011, and which is incorporated herein by reference.

BACKGROUND OF THE INVENTION

1. Field of the Invention

The present invention relates in general to a traffic signal light device, and more in particular to the traffic signal light device using high power Light-Emitting Diodes (LEDs).

2. Description of the Related Art

Light-Emitting Diodes (LEDs) have been used in many applications to replace the conventional incandescent lamps, fluorescent lamps, Neon tube and fiber optics light sources to reduce electrical cost, maintenance cost and increase reliability. Due to the fact that LEDs consume less electrical energy than conventional light sources while exhibiting much longer lifetime, many designs have been invented for various applications, such as traffic signal lights, channel letters, conventional illuminated commercial signs, street lights and street signs.

Recent advancements of high power LED technology enable additional applications over the conventional 5 mm (T1-¾) LEDs because of its higher light output efficiency and lower cost. However, for certain applications, such as traffic signal lights, the use of high power LEDs have been somewhat hampered because their light distribution pattern is not readily compatible with the asymmetric light distribution pattern required for traffic signal lights.

When high power LEDs are used for traffic signal applications, a Fresnel lens, as well as a spreading lens with a specific optical design, are used to distribute the light to meet the required specifications, such as the design by Keuper and Van Hees (U.S. Pat. No. 5,947,587) and by Wu, et al (U.S. Pat. No. 6,911,915). Besides the fact that the light emission pattern from the high power LEDs is symmetrical, the product designs in almost all cases center the light engine around the physical center of the device. This presents some difficulties in meeting the light distribution specifications which in general are non-symmetrical. In addition, placing the light engine around the center of the device in many cases presents some physical constraints on placing other components needed for the device.

SUMMARY OF THE INVENTION

Accordingly, one objective of the present invention is to provide an optical lens design that can efficiently couple the light from the high power LED to the asymmetrical Fresnel lens and then to the spreading lens for the desired light distribution pattern. The improvements of this new improved optical lens design for the high power LEDs represents a major advantage over the conventional symmetric lens designs. Additionally, major savings can be realized in product maintenance costs.

According to one aspect of the present invention, a traffic signal light device is provided to comprise: a spread window having an axis passing through the center of, and is perpendicular to, the spread window; a Fresnel lens; and a LED module for emitting light, wherein the light emitted from the LED module passes through the Fresnel lens to the spread window, and wherein the LED module is offset from the axis of the spread window.

According to another aspect of the present invention, a traffic signal light device is provided to comprise: a spread window having an axis passing through the center of, and is perpendicular to, of the spread window; a Fresnel lens; and a LED module for emitting light, wherein the light emitted from the LED module passes through the Fresnel lens to the spread window, and wherein the spread window has a plurality of protruding cells forming a protruding cell pattern on the surface of the spread window, wherein the protruding cells contain at least two sizes.

BRIEF DESCRIPTION OF THE DRAWINGS

The invention will become apparent from the following detailed description of the preferred but non-limiting embodiments. The following description is made with reference to the accompanying drawings.

DETAILED DESCRIPTION OF THE INVENTION

Figure 1A:
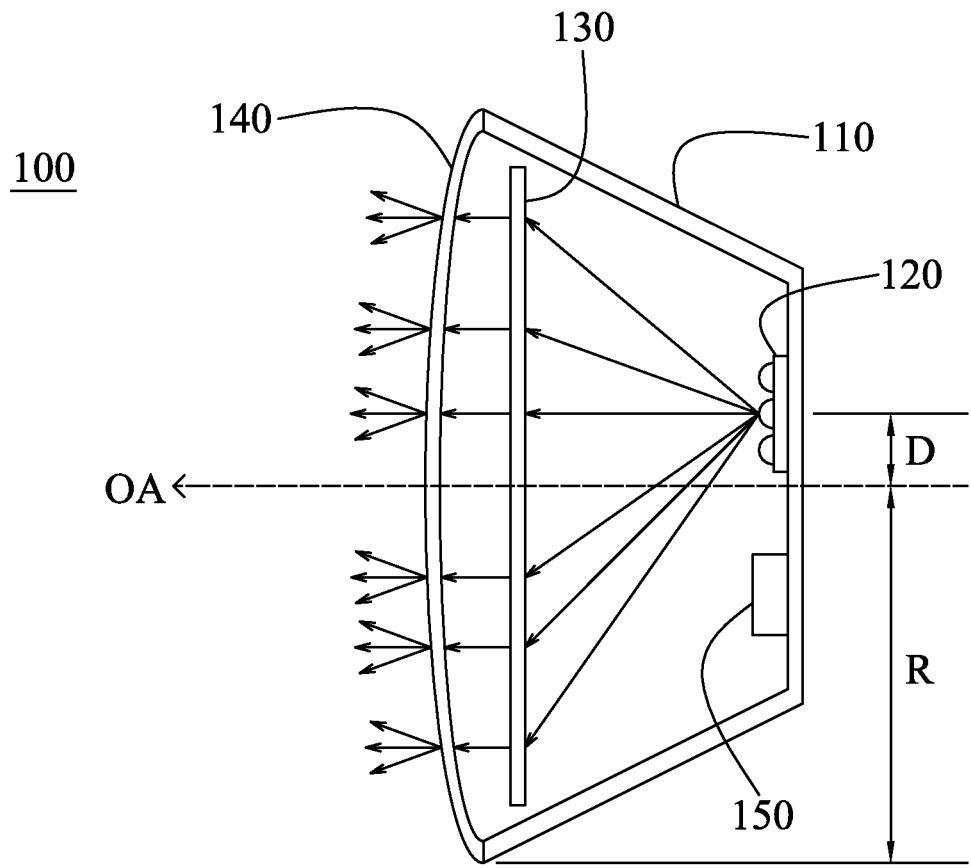
FIG. 1A shows a schematic cross section view of a traffic signal light device according to an embodiment of the present invention.

FIG. 1A shows a schematic cross section view of a traffic signal light device 100 according to an embodiment of the present invention. The traffic signal light device 100 includes a housing 110, an LED module 120, a Fresnel lens 130 and a spread window 140. Light emitted from the LED module 120 passes through the Fresnel lens 130 to the spread window 140, and then is emitted from the spread window 140 to the outside.

According to the embodiment, the traffic signal light device 100 has an optical axis OA which passes through the center of, and is perpendicular to, the spread window 140. The LED module 120 is disposed on the bottom plate of the housing 110 and is disposed a radial distance D from the optical axis OA. Moreover, the distance between the optical axis OA and the periphery of the spread window 140 is defined as a radius R of the spread window 140, wherein the value of D/R is between 0.02 to 0.5 (i.e. $0.02 \leq D/R \leq 0.5$).

Figure 1B:
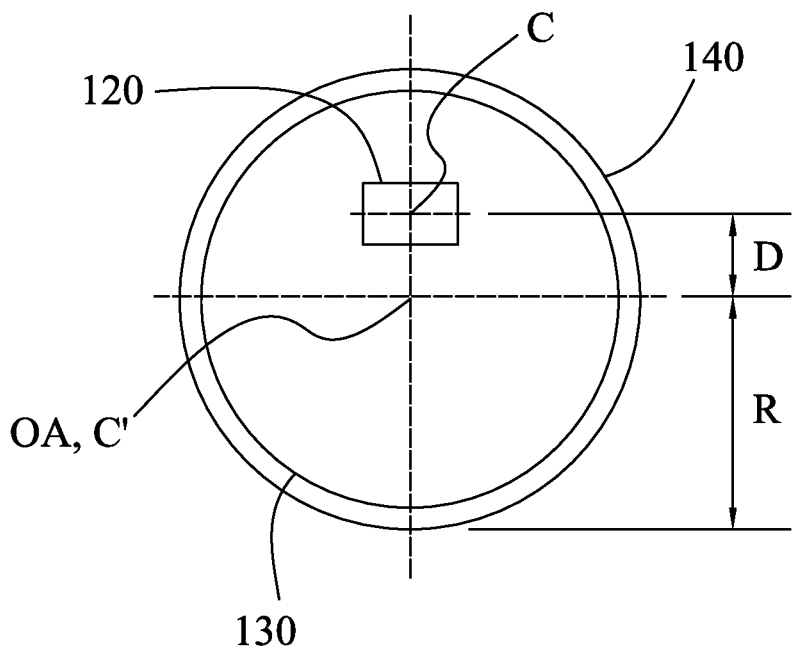
FIG. 1B shows a schematic front view of the traffic signal light device according to FIG. 1A.

FIG. 1B shows a schematic front view of the traffic signal light device 100 according to FIG. 1A. The LED module 120 is disposed to have an offset from the center of the spread window.

According to the embodiment, the traffic signal light device 100 further comprises a power supply 150 which is disposed on the bottom plate of the housing 110 for providing power to the LED module 120.

Figure 2A:
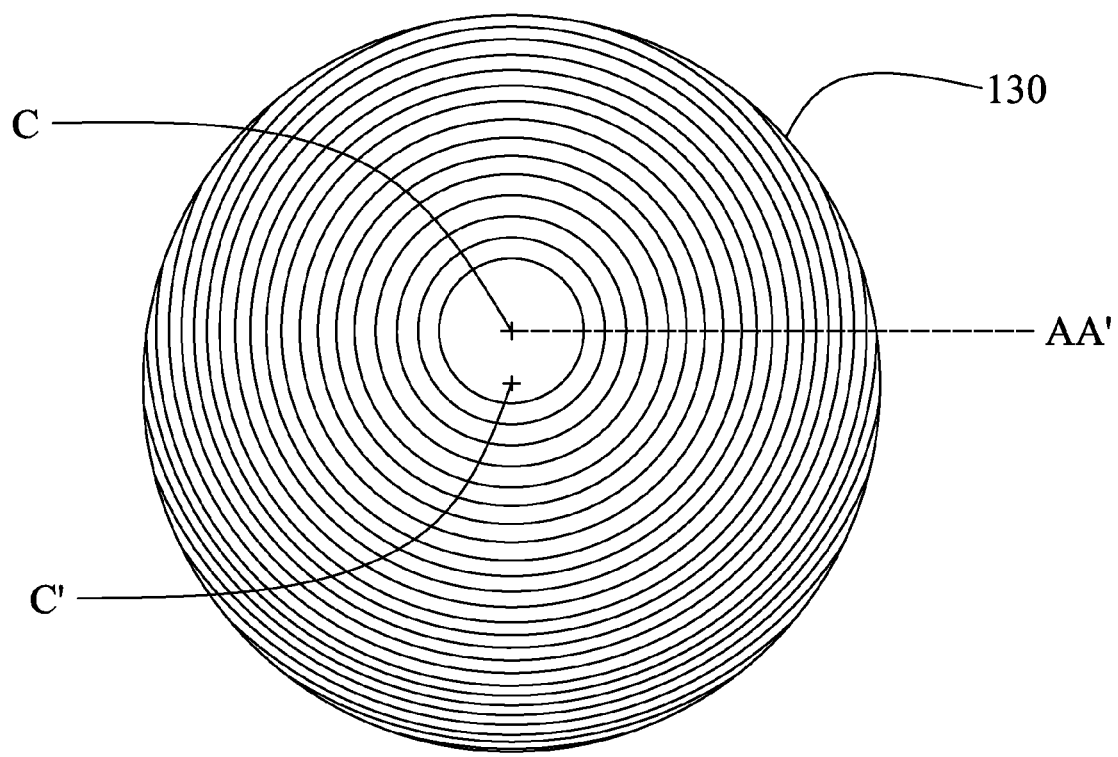
FIG. 2A shows a front view of a Fresnel lens according to the present invention.
Figure 2B:
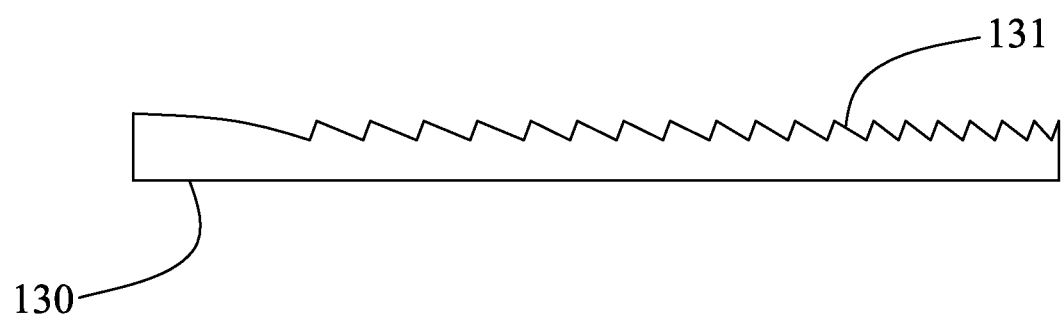
FIG. 2B shows a schematic cross section view of one embodiment of the Fresnel lens along a line AA'.
Figure 2C:
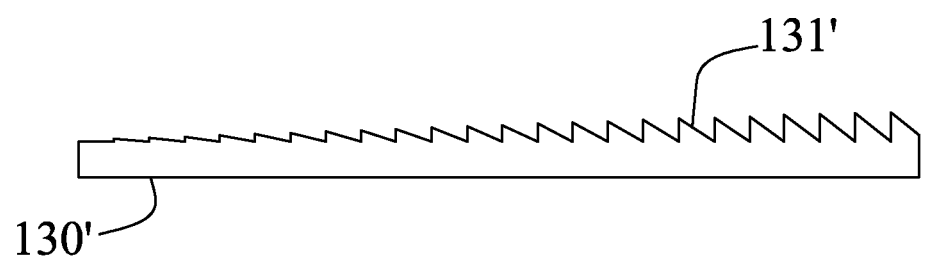
FIG. 2C shows a schematic cross section view of another embodiment of the Fresnel lens along a line AA'.

FIG. 2A shows a front view of the Fresnel lens 130 according to the embodiment of the present invention, and FIG. 2B shows a schematic cross section view of one embodiment of the Fresnel lens 130 along a line AA'. FIG. 2C shows a schematic cross section view of another embodiment of the Fresnel lens 130 along a line AA'.

According to the embodiment, the Fresnel lens 130 has a saw-toothed pattern 131 formed on one surface of the Fresnel lens 130. Each tooth of the saw-toothed pattern 131 is formed as a concentric circle, wherein the concentric circle has a center C. Further, the Fresnel lens 130 has a center C' itself, and the center C of the concentric circles of the saw-toothed pattern 131 is offset from the center C' of the Fresnel lens 130 as shown in FIG. 2A.

In one embodiment of present invention, the size of the tooth located at the inner concentric circle is bigger than that of the tooth located at the outer concentric circle as shown in FIG. 2B.

In another embodiment of the present invention, the height of the tooth located at the inner concentric circle is lower than that of the tooth located at the outer concentric circle. Specifically, FIG. 2C shows a schematic cross section view of another embodiment of the Fresnel lens 130' along the line AA'. In this embodiment, the Fresnel lens 130' has a saw-toothed pattern 131' formed on one surface of the Fresnel lens 130, and the height of the tooth located at the inner concentric circle is lower than that of the tooth located at the outer concentric circle.

Figure 3A:
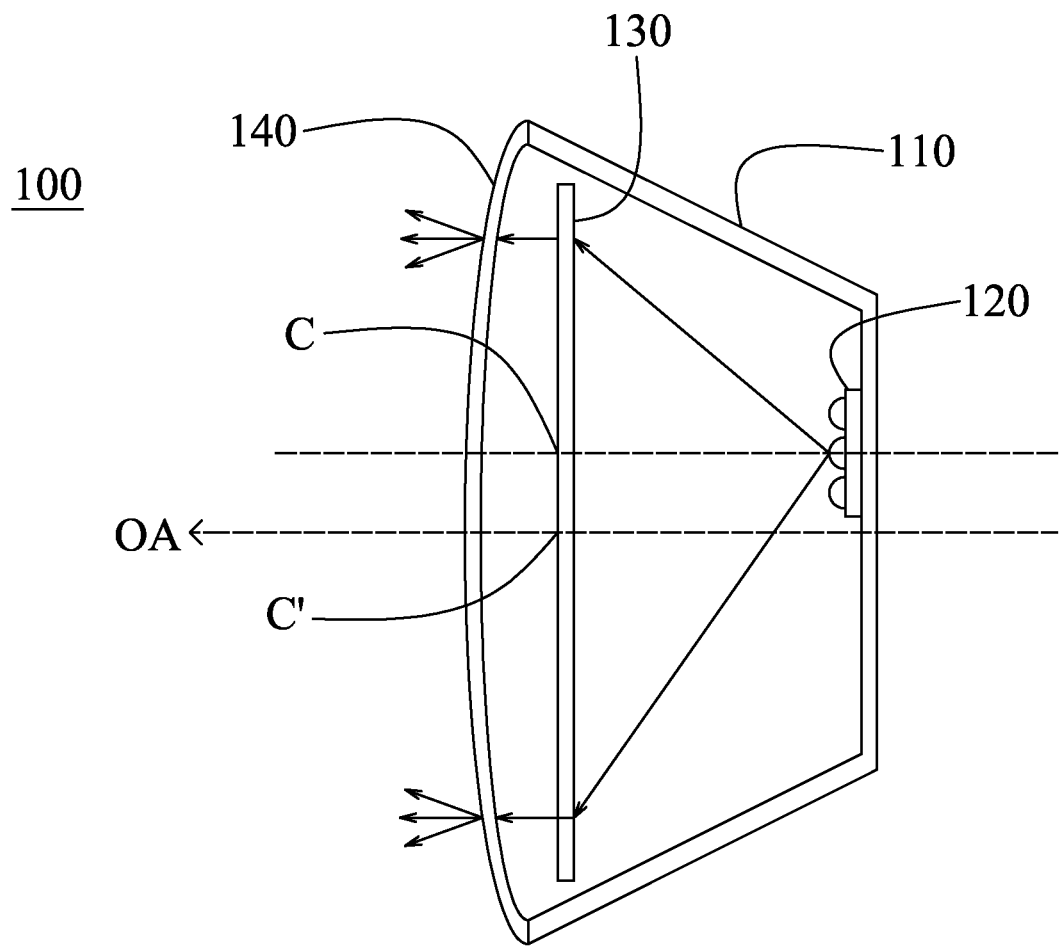
FIG. 3A shows a schematic cross section view of another embodiment of the traffic signal light device.
Figure 3B:
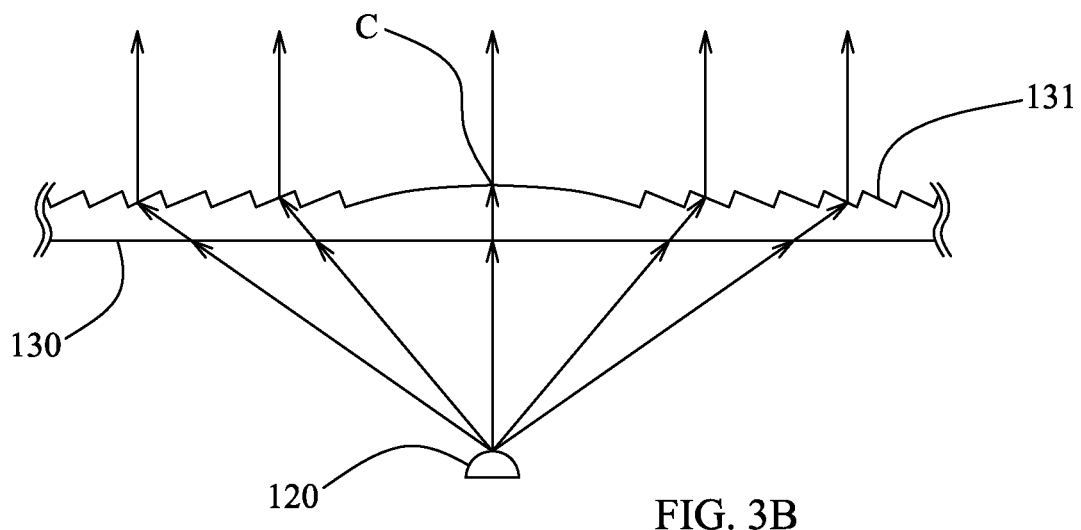
FIG. 3B shows a schematic cross section view of the Fresnel lens and the LED module for the embodiment of FIG. 3A.

FIG. 3A shows another schematic cross section view of the traffic signal light device 100 according to the embodiment of the present invention. According to the embodiment, the center C of the saw-toothed pattern 131 is aligned to the position of the LED module 120 in the axis direction, which is also shown in FIG. 1B. The center C' of the Fresnel lens 130 is aligned to the center of the spread window 140, and the center C of the concentric circles of the saw-toothed pattern 131 has an offset from the center of the spread window 140 and the center C' of the Fresnel lens 130. Moreover, FIG. 3B shows a schematic cross section view of the Fresnel lens 130 and the LED module 120. The light emitted from the LED module 120 is transferred as parallel light (i.e. collimated) by the Fresnel lens 130.

Figure 4A:
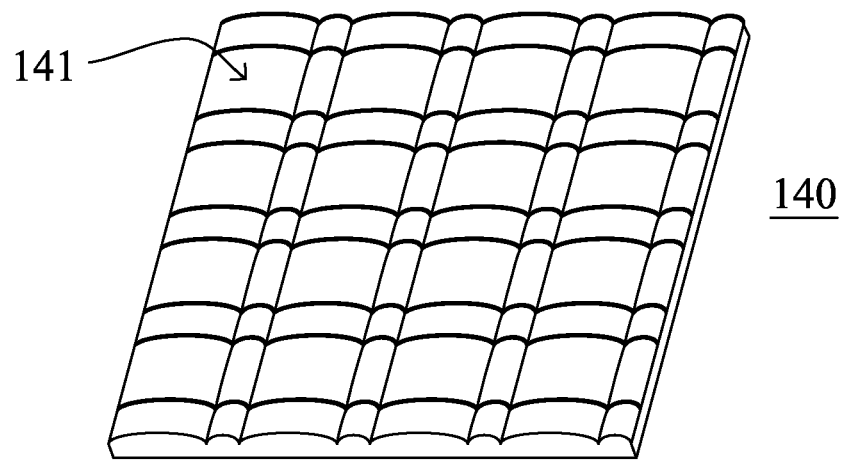
FIGS. 4A and 4B show different designs of cell patterns of the spread window according to an embodiment of the present invention.
Figure 4B:
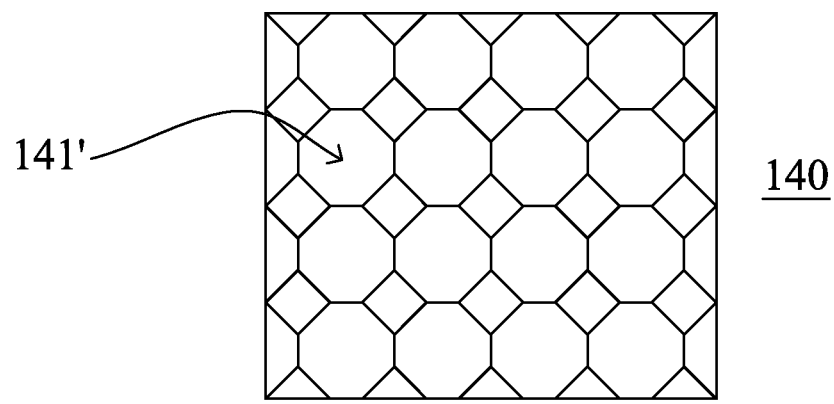

FIGS. 4A and 4B show different designs of a cell pattern 141, 141' of a spread window 140 according to an embodiment of the present invention.

According to the embodiment, the spread window 140 has a protruding cell pattern 141, 141' formed on the surface of the spread window 140. FIG. 4A and 4B respectively show different cell pattern designs on spread window 140. The protruding cells of the protruding cell pattern 141, 141' contain at least two sizes. In one embodiment, as shown in FIG. 4A, the cells of the cell pattern 141 contain three sizes, and all cells have the same quadrangle shape. In another embodiment, as shown in FIG. 4B, the cells of the cell pattern 141' contain two sizes, wherein the big size cells have an octagon shape, and the small size cells have a quadrangle shape. In the present invention, the shape of the protruding cells, the number of the sizes of protruding cells, or the arrangement of the protruding cell pattern is not limited.

Figure 5A:
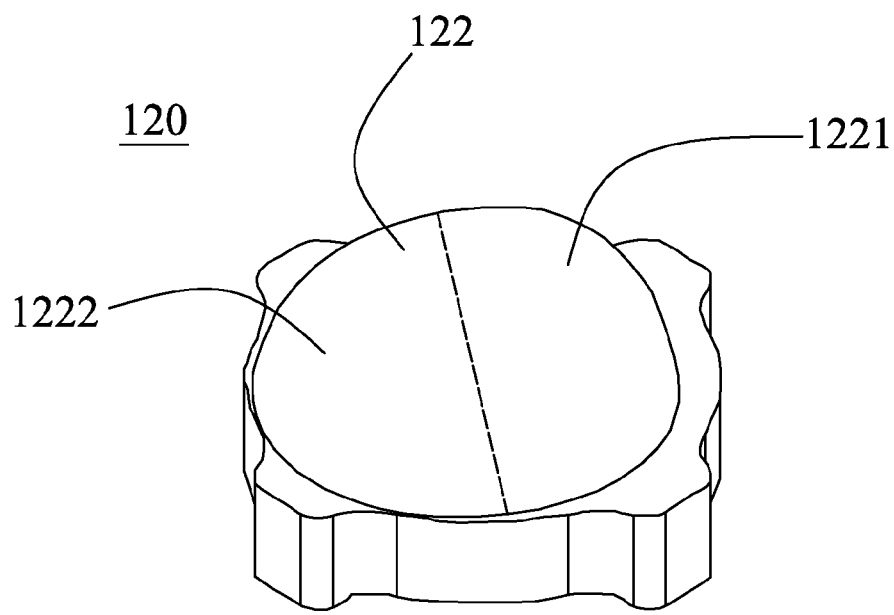
FIG. 5A shows a schematic view of a LED module with single LED and single LED lens.

FIG. 5A shows a schematic view of an LED module 120 with a single LED and a second optical element 122. In this embodiment, the second optical element 122 is a lens.

Figure 5B:
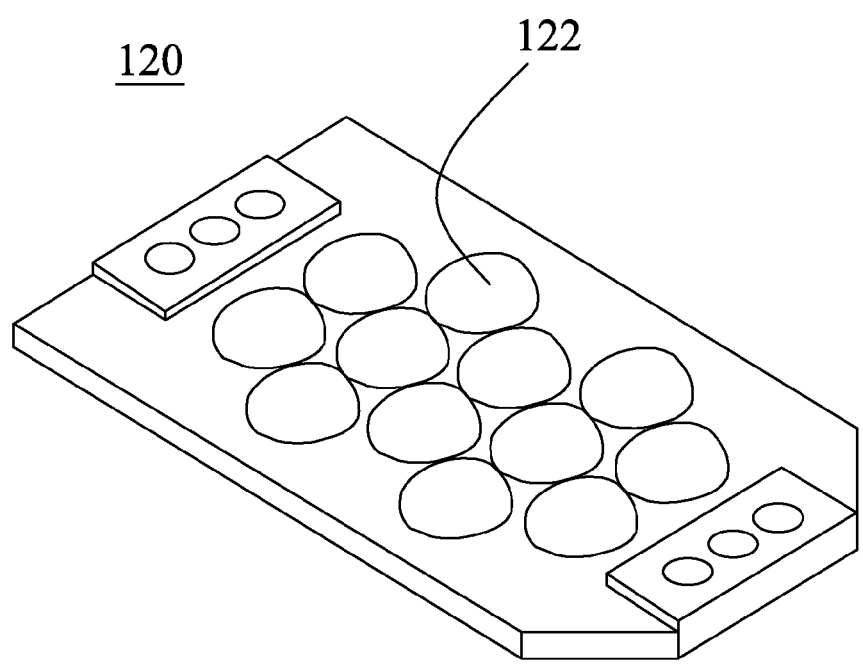
FIG. 5B shows a schematic view of a LED module with multiple LEDs and multiple LED lenses.
Figure 6A:
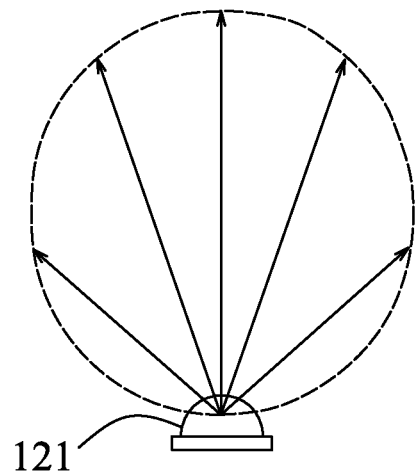
FIG. 6A shows a schematic view of a light emitting profile of an LED without an LED lens.
Figure 6B:
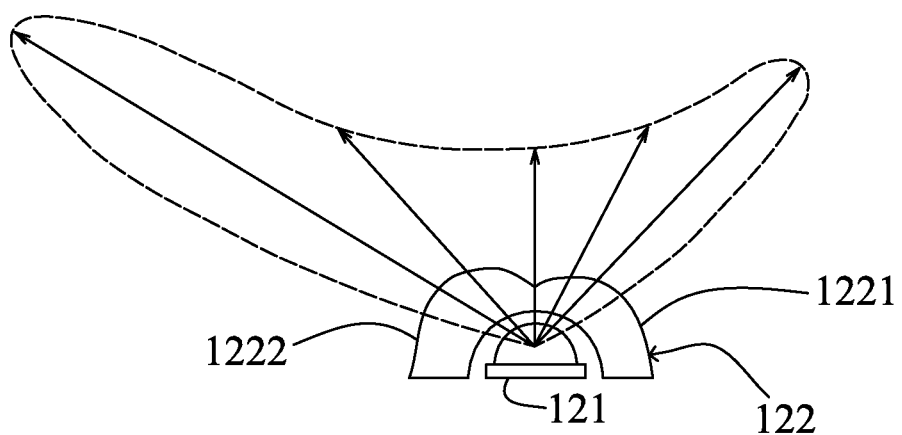
FIG. 6B shows a schematic view of a light emitting profile of an LED with an LED lens according to a first embodiment of an LED lens.
Figure 6C:
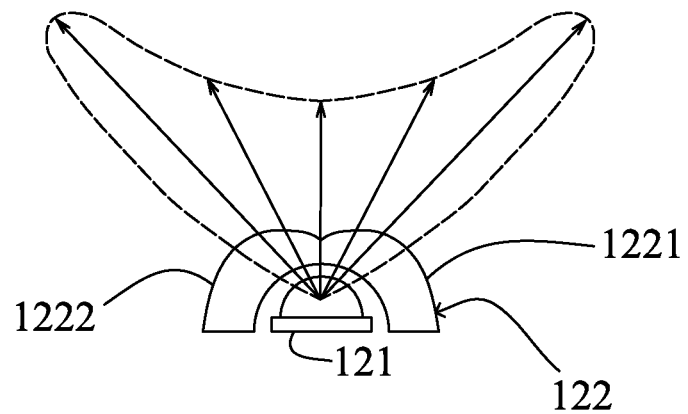
FIG. 6C shows a schematic view of a light emitting profile of an LED with an LED lens according to a second embodiment of an LED lens.

According to one embodiment, the LED module 120 includes an LED 121 and an LED lens 122, wherein the LED 121 is covered by the LED lens 122 as shown in FIG. 6B and 6C. The LED lens 122 is formed as a whole and is divided into a first portion 1221 and a second portion 1222 of similar or different shape for controlling the light emitting profile of the LED 121. Moreover, in another embodiment, the LED module 120 includes a plural of LEDs and a plural of LED lenses 122 as shown in FIG. 5B. FIG. 5B shows a schematic view of an LED module with multiple LEDs and multiple LED lenses.

Figure 5C:
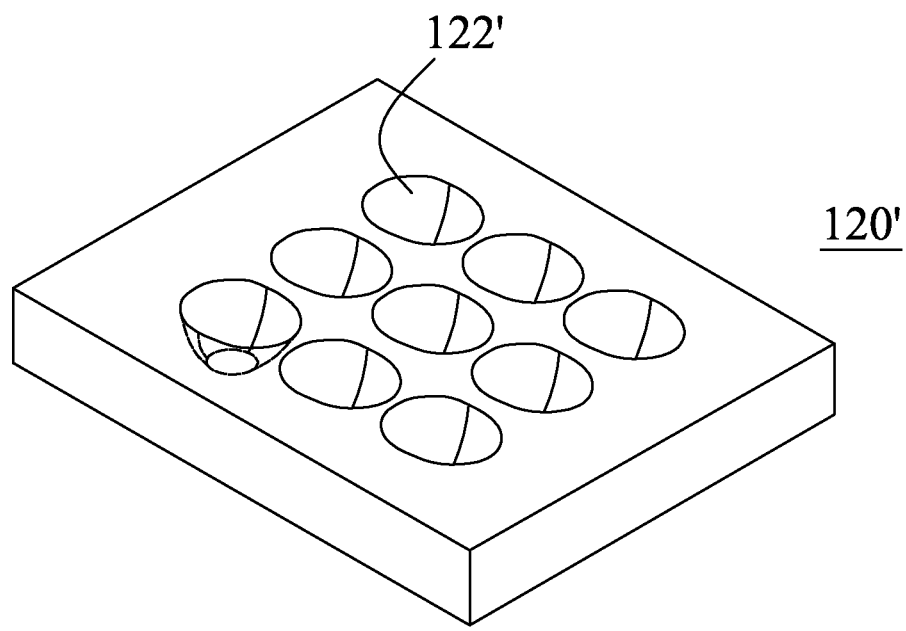
FIG. 5C shows a schematic view of a LED module with multiple LEDs and multiple LED lenses according to another embodiment.

In a further embodiment of the LED module 120' as shown in FIG. 5C, the second optical element is a LED reflector 122', and the LED is disposed on the bottom the LED reflector 122' (not shown). The LED reflector 122' also can be divided into a first portion and a second portion of similar or different shape for controlling the light emitting profile of the LED.

The divided portions of LED lens 122 control the light emitting profile of the LED. Specifically, FIG. 6A shows a schematic view of a light emitting profile of LED 121 without any second optical element (i.e. without lens 122). FIG. 6B shows a schematic view of a light emitting profile of LED 121 with LED lens 122 according to a first embodiment of LED lens 122. FIG. 6C shows a schematic view of a light emitting profile of LED 121 with LED lens 122 according to a second embodiment of LED lens 122.

As shown in FIG. 6A, the light emitting profile of single LED 121 is like a circle, and the light intensity near the center is stronger than that near the sides. According to the characteristic of LED, the light devise using LED 121 as light source light fails to provide uniform illumination on an illumination area without a special design. In order to change the light emitting profile for providing uniform illumination, the present invention provides embodiments of the LED lens.

According to first embodiment of LED lens 122 as shown in FIG. 6B, the LED lens 122 comprises a first portion 1221 and a second portion 1222, wherein the first portion 1221 and the second portion 1222 are asymmetric for providing an asymmetric light emitting profile as shown in FIG. 6B. In this embodiment, the light intensity near the center is smaller than that near the sides, and the light intensities at two sides are different.

The embodiment of LED lens 122 in FIG. 6B can be used in the traffic signal light device provided in the present invention, wherein the LED module is disposed to be offset from the center of the spread window. In FIG. 1A, the LED module 120 is disposed at upper side of the optical axis OA. Therefore, in order to get uniform illumination on the Fresnel lens 130, the light emitting profile of the LED module 120 is asymmetric as shown in FIG. 6B. More specifically, the light intensity at the upper side of the LED module 120 is smaller than that at the lower side of the LED module 120 to obtain a uniform illumination on the Fresnel lens 130.

According to a second embodiment of LED lens 122 as shown in FIG. 6C, the LED lens 122 comprises a first portion 1221 and a second portion 1222, wherein the first portion 1221 and the second portion 1222 are symmetric for providing symmetric light emitting profile as shown in FIG. 6C. In this embodiment, the light intensity near the center is smaller than that near the sides.

Both of the first and the second embodiments of the LED lens in FIGS. 6B and 6C can provide uniform illumination on the illumination area.

Figure 7A:
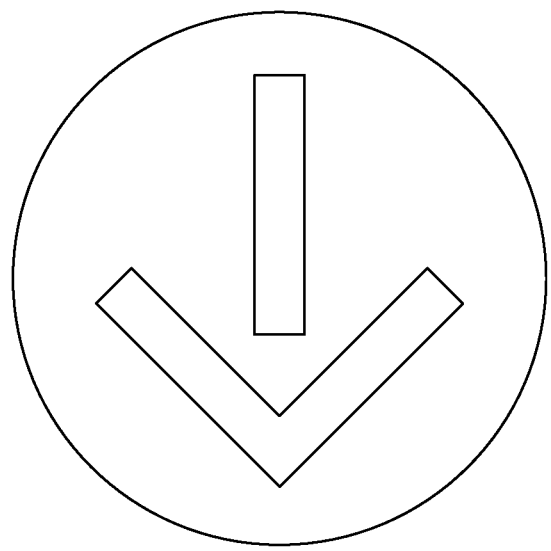
FIG. 7A shows a schematic view of an indicating signal shape of the traffic signal.
Figure 7B:
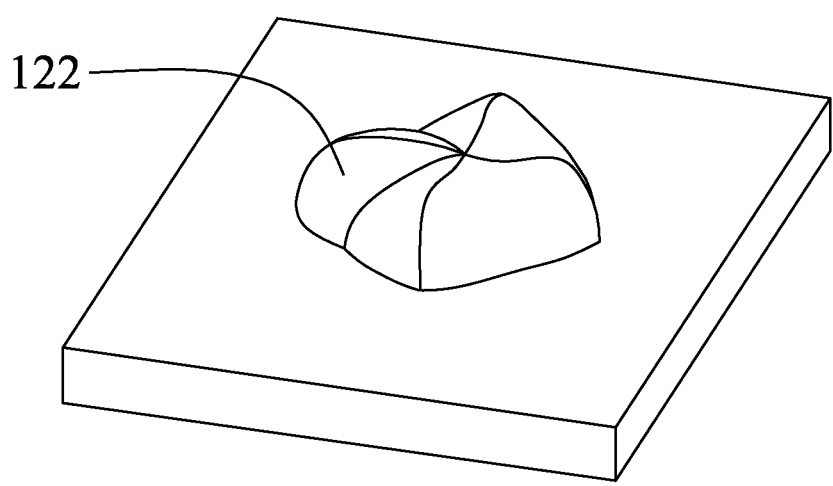
FIG. 7B shows a schematic view of an LED lens having a shape related to the indicating signal shape according to a third embodiment of an LED lens.

FIG. 7A shows a schematic view of an indicating signal shape of the traffic signal (i.e. the traffic signal includes a mask which is selectively light transmissive only for those portions within the indicating signal shape). FIG. 7B shows a schematic view of an LED lens 122 having a shape related to the indicating signal shape according to a third embodiment of the LED lens.

The traffic signal may have a special indicating shape, for example, an arrow shape for indicating directions as shown in FIG. 7A. In this case, the LED light still illuminates on the whole signal area (the whole round area). However, only the LED light illuminating on the arrow shape can be emitted out, and the other LED light is blocked from forming the arrow-shaped indication. Therefore, the light energy of the LED light is wasted.

Accordingly, the present invention provide a third embodiment of the LED lens as shown in FIG. 7B. In this embodiment, the LED lens 122 has a shape related to (i.e. matching) the indicating signal shape of the traffic signal. For example, the indicating signal shape of the traffic signal shown in FIG. 7A is an arrow, and the shape of the LED lens 122 is designed to be similar to the arrow as shown in FIG. 7B. As the LED lens 122 has a shape related to the indicating signal shape, the light intensity of light emitted from the LED lens can be focused on the indicating signal shape for increasing the efficiency of the traffic signal light device.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures. Additionally, references to the present invention herein are not intended to limit the scope of any claim or claim term, but instead merely make reference to one or more features that may be covered by one or more of the claims.

What is claimed is:

1. A traffic signal light device, comprising:
   a spread window;
   a Fresnel lens; and
   an LED module for emitting light, wherein the light emitted by the LED module passes through the Fresnel lens and to the spread window,
   wherein the LED module is disposed at a position that is offset from an axis of the spread window that passes through a center of, and is perpendicular to, the spread window;
   wherein the Fresnel lens has a saw-toothed pattern formed on one surface of the Fresnel lens; and
   wherein the saw-toothed pattern is formed as a plurality of concentric circles of teeth all sharing a common center that is offset from a center of the Fresnel lens.

2. The traffic signal light device according to claim 1, wherein the disposed position of the LED module is offset from the axis by a distance D, the spread window has a radius R, and the value of D/R is between 0.02 to 0.5.

3. The traffic signal light device according to claim 1 further comprising:
   a housing having a bottom plate, wherein the LED module is disposed on the bottom plate; and
   a power supply disposed on the bottom plate for providing power to the LED module.

4. The traffic signal light device according to claim 1, wherein a size of the tooth of the saw-toothed pattern closest to the common center is larger than that of the tooth of the saw-toothed pattern furthest from the common center.

5. The traffic signal light device according to claim 1, wherein a height of the tooth of the saw-toothed pattern closest to the common center is lower than that of the tooth of the saw-toothed pattern furthest from the common center.

6. The traffic signal light device according to claim 1, wherein the common center is disposed over and aligned to the LED module, and the center of the Fresnel lens is aligned to the axis.

7. The traffic signal light device according to claim 1, wherein the spread window has a plurality of protruding cells forming a protruding cell pattern on a surface of the spread window, wherein some of the protruding cells have a size different than that of others of the protruding cells.

8. The traffic signal light device according to claim 1, wherein the LED module includes an LED and a second optical element over the LED, wherein the second optical element is divided into a first portion and a second portion for dictating a light emitting profile of the LED.

9. The traffic signal light device according to claim 8, wherein the first portion and the second portion are asymmetric for dictating an asymmetric light emitting profile.

10. The traffic signal light device according to claim 8, wherein the first portion and the second portion are symmetric for dictating a symmetric light emitting profile.

11. The traffic signal light device according to claim 8, wherein the second optical element is a lens.

12. The traffic signal light device according to claim 1, wherein the LED module includes an LED and a reflector adjacent the LED.

13. The traffic signal light device according to claim 8, wherein the second optical element has a shape related to an indicating signal shape of a mask of the traffic signal.

14. The traffic signal light device according to claim 1, wherein the LED module includes an LED and a second optical element over the LED, and wherein the second optical element has a shape related to an indicating signal shape of a mask of the traffic signal.

15. A traffic signal light device, comprising:
    a spread window;
    a Fresnel lens; and
    an LED module for emitting light, wherein the light emitted from the LED module passes through the Fresnel lens to the spread window,
    wherein the spread window has a plurality of protruding cells forming a protruding cell pattern on a surface of the spread window, wherein some of the protruding cells have a size different than that of others of the protruding cells;
    wherein the Fresnel lens has a saw-toothed pattern formed on one surface of the Fresnel lens; and
    wherein the saw-toothed pattern is formed as a plurality of concentric circles of teeth all sharing a common center that is offset from a center of the Fresnel lens.

16. The traffic signal light device according to claim 15, wherein the LED module is disposed at a position that is offset from an axis of the spread window that passes through a center of, and is perpendicular to, the spread window.

17. The traffic signal light device according to claim 15, wherein:
   a size of the tooth of the saw-toothed pattern closest to the common center is larger than that of the tooth of the saw-toothed pattern furthest from the common center.

18. The traffic signal light device according to claim 15, wherein:
   a height of the tooth of the saw-toothed pattern closest to the common center is lower than that of the tooth of the saw-toothed pattern furthest from the common center.

* * * * *